(12) United States Patent
Cameron et al.

(10) Patent No.: US 11,440,748 B2
(45) Date of Patent: Sep. 13, 2022

(54) LINEAR MOTOR CONVEYOR SYSTEM FOR CLEAN/ASEPTIC ENVIRONMENTS

(71) Applicant: ATS AUTOMATION TOOLING SYSTEMS INC., Cambridge (CA)

(72) Inventors: Louis Ian Cameron, Cambridge (CA); Albert Kleinikkink, Cambridge (CA); Roger Hogan, Cambridge (CA); Martin John Juritsch, Cambridge (CA); Bradley James Woodward, Cambridge (CA); Blake Robert Lambert, Cambridge (CA)

( * ) Notice: Subject to any disclaimer, the term of this patent is extended or adjusted under 35 U.S.C. 154(b) by 0 days.

(21) Appl. No.: 16/944,951

(22) Filed: Jul. 31, 2020

(65) Prior Publication Data

US 2020/0361722 A1 Nov. 19, 2020

Related U.S. Application Data

(63) Continuation of application No. PCT/CA2019/050142, filed on Feb. 4, 2019.

(Continued)

(51) Int. Cl.
*B65G 54/02* (2006.01)
*B65G 21/20* (2006.01)
(Continued)

(52) U.S. Cl.
CPC ......... *B65G 54/02* (2013.01); *B65G 21/2054* (2013.01); *B65G 21/22* (2013.01);
(Continued)

(58) Field of Classification Search
CPC ...... H02K 9/08; H02K 41/03; B65G 21/2009; B65G 54/02; B65G 23/23; B65G 21/06;
(Continued)

(56) References Cited

U.S. PATENT DOCUMENTS 2,618,375 A * 11/1952 Rahlson ............... B65G 17/126
198/860.2
3,878,936 A * 4/1975 Niggemyer ............ B65G 21/08
198/860.2
(Continued)

FOREIGN PATENT DOCUMENTS

| EP | 3031755 A1 | 6/2016 |
| EP | 3072836 A1 | 9/2016 |
| WO | 2017108421 A1 | 6/2017 |

OTHER PUBLICATIONS

International Search Report, International Bureau, for corresponding PCT Application No. PCT/CA2019/050142, dated Apr. 12, 2019.

(Continued)

*Primary Examiner* — James R Bidwell
(74) *Attorney, Agent, or Firm* — Amarok IP Inc.; Neil W. Henderson

(57) ABSTRACT

A linear motor conveyor system including: at least one track section comprising: electronic circuitry housed within the track section; and a rotatable segment comprising an end profile that abuts another track section to form a stepped groove sealed by a gasket. A moving element for a linear motor conveyor system including: a body; a first set of bearings attached to the body and angled to abut against a first guide rail of a conveyor system having a protrusion with opposing angled profiles; a second set of bearing attached to the body and designed to abut against a flat profile of a second guide rail of the conveyor system.

15 Claims, 18 Drawing Sheets

Related U.S. Application Data

(60) Provisional application No. 62/625,692, filed on Feb. 2, 2018.

(51) Int. Cl.
*B65G 21/22* (2006.01)
*H02K 9/08* (2006.01)
*H02K 41/03* (2006.01)

(52) U.S. Cl.
CPC ............... *H02K 9/08* (2013.01); *H02K 41/03* (2013.01); *B65G 2203/0266* (2013.01); *B65G 2203/042* (2013.01); *B65G 2207/48* (2013.01)

(58) Field of Classification Search
CPC B65G 21/2054; B65G 21/22; B65G 2207/48; B65G 2203/042; B65G 2203/0266; B65G 19/287
USPC .... 198/678.1, 464.4, 805, 619, 860.2, 735.6
See application file for complete search history.

(56) References Cited

U.S. PATENT DOCUMENTS

| | | | |
|---|---|---|---|
| 5,056,938 A | | 10/1991 | Robert et al. |
| 5,456,346 A | * | 10/1995 | Schilling .............. B65G 19/025 198/465.4 |
| 6,191,507 B1 | * | 2/2001 | Peltier .................... B65G 54/02 310/12.02 |
| 6,957,734 B2 | * | 10/2005 | Imai ....................... B23Q 7/035 198/472.1 |
| 8,397,896 B2 | * | 3/2013 | Kleinikkink ........... B65G 43/00 198/345.3 |
| 9,428,936 B2 | * | 8/2016 | Fenayon ................. E05B 85/06 |
| 10,029,855 B2 | * | 7/2018 | Grosskreuz ............ B65G 23/23 |
| 10,569,974 B2 | * | 2/2020 | Neubauer .............. B65G 54/02 |
| 10,781,854 B2 | * | 9/2020 | Neufeld .................. B61B 13/00 |
| 2003/0230941 A1 | * | 12/2003 | Jacobs ................ B29C 66/1122 310/12.19 |
| 2010/0109449 A1 | | 5/2010 | Hoppe |
| 2011/0239665 A1 | * | 10/2011 | Bilger ..................... A23L 3/375 62/64 |
| 2014/0291124 A1 | * | 10/2014 | Fenile .................... B65G 47/82 198/617 |
| 2015/0027338 A1 | * | 1/2015 | Aumann ................. B60L 13/03 104/290 |
| 2015/0027860 A1 | * | 1/2015 | Kleinikkink ........ B65G 21/2009 198/867.01 |
| 2015/0083018 A1 | | 3/2015 | Clark et al. |
| 2016/0281789 A1 | | 9/2016 | Kleinikkink et al. |

OTHER PUBLICATIONS

Extended European Search Report, European Patent Office, for corresponding EP Application No. 19748171.6, dated Sep. 28, 2021.

* cited by examiner

LINEAR MOTOR CONVEYOR SYSTEM FOR CLEAN/ASEPTIC ENVIRONMENTS

RELATED APPLICATIONS

This application is a continuation of PCT/CA2019/050142 filed Feb. 4, 2019, which claims priority from U.S. Provisional Application No. 62/625,692 filed Feb. 2, 2018, all of which are hereby incorporated herein by reference.

FIELD

The present disclosure relates generally to linear motor conveyor systems and bearing systems for moving elements on a linear motor conveyor. More particularly, the disclosure relates to a linear motor conveyor and moving element, which may be configured for use in an environment that requires reduced levels of contaminants such as a clean or aseptic environment.

BACKGROUND

In conventional linear motor conveyors or systems, a moving element is controlled to move along a track by electromotive force. In a moving magnet linear motor, the moving element typically includes a magnet that interacts with the magnetic field produced from the stationary coils on the track to propel the moving element along the track. In order to allow movement, the moving element generally has one or more bearings, which run along the track and are supported by guide rails or the like on the track. The bearings are provided to the moving element such that the moving element can move along the track/guide rail while a bearing surface of the bearing is in contact with the guide rail. Depending on the application, the bearings may include, for example, wheels, rollers, plain bearings, ball bearings, needle bearings, roller bearings and the like.

Conventional linear motor conveyor systems are not designed to operate in aseptic environments (sometimes called "clean rooms" or the like). This may be an issue because some products, such as pharmaceuticals, medical products, electronics or the like, may require clean, aseptic or sterile environments in which, dust, debris, bacteria and other contaminates are reduced, controlled or eliminated during manufacturing. However, many conventional linear motor conveyor systems have components that actually enable the formation, collection or propagation of contaminates, for example from mechanical friction, collection in cracks and crevices between components, or the like, which can be problematic.

Further, conventional bearings may not be conducive to a sterile environment. Typically, various lubricants, such as, oil, grease, and the like have been used to provide for smoother movement and function of moving elements traversing the linear conveyor system. These lubricants are generally not be suitable for use in a clean, aseptic or sterile environment.

In view of the above considerations and other problems encountered within the manufacturing industry there is a need for improved linear motor conveyor systems and, in particular, for linear motor conveyor systems for use in clean, aseptic or sterile environments and the like.

SUMMARY

According to one aspect herein, there is provided a linear motor conveyor system including: at least one track section comprising: electronic circuitry housed within the track section; and a rotatable segment comprising an end profile that abuts another track section to form a stepped groove sealed by a gasket.

In some cases, the stepped groove may include: a rear gap portion comprising a gap of between 1 and 5 mm; and a front gap portion comprising a gap of between 0.25 and 0.5 mm.

In some cases, the stepped groove may include: a rear gap portion sized to receive the gasket; and a front gap portion sized to enable a bearing to ride along the track section while promoting cleaning of the front gap portion.

In some cases, the front gap portion may be more steeply angled than the rear gap portion.

In some cases, the linear motor conveyor system may include an internal cooling system configured to draw air inwards towards the electronic circuitry housed within the track system.

In another aspect, there is provided a linear motor conveyor system including: at least one track section comprising: a guide rail portion configured to support a moving element transporting an object; an angled top portion configured to direct air flow to contact the object prior to another element of the linear motor conveyor system; and a curved edge connecting the angled top to the guide rail portion, wherein the curved edge is configured to reduce air recirculation.

In some cases, each track section may include a plurality of sensors provided to read a machine readable medium located on the moving element, wherein the plurality of sensors are sealed within the track section.

In some cases, the plurality of sensors may be sealed by stainless steel tape.

In yet another aspect, there is provided a moving element for a linear motor conveyor system including: a body; a first set of bearings attached to the body and angled to abut against a first guide rail of a conveyor system having a protrusion with opposing angled profiles; a second set of bearings attached to the body and designed to abut against a flat profile of a second guide rail of the conveyor system.

In some cases, the first set of bearings may include at least one pair of bearings wherein a top bearing abuts against a top of the angled profile of the first guide rail and a bottom bearing abuts against a bottom of the angled profile of the first guide rail.

In some cases, the moving element may include a solid lubricant.

In some cases, the solid lubricant may be Polytetrafluoroethylene.

In some cases, the opposing angled profiles may define a "V" shaped profile.

In still yet another aspect, there is provided a conveyor system including: at least one track section comprising: a first guide rail having a protrusion with opposing angled profiles; a second guide rail having a flat profile; electronic circuitry housed within a body of the track section; a rotatable segment configured to provide access to the electronic circuitry, the rotatable segment having an end profile that abuts another track section to form a stepped groove sealed by a gasket; an angled top configured to direct air flow around the track section; a curved edge between the first guide rail and the angled top configured to reduce air recirculation; and a plurality of sensors sealed within a top portion of the track section; and at least one moving element comprising: a body; a first set of bearings attached to the body and configured to abut against the opposing angled profiles of the protrusion on the first guide rail; a second set of bearings attached to the body and configured to abut against the second guide rail; and a machine readable medium configured to be read by the plurality of sensors.

In some cases, the conveyor system or the moving element may further may include a solid lubricant. In some cases, the solid lubricant may be polytetrafluoroethylene.

In some cases, the plurality of sensors may be sealed by stainless steel tape.

In some cases, the stepped groove may include: a rear gap portion comprising a gap of between 1 and 5 mm; and a front gap portion comprising a gap of between 0.25 and 0.5 mm.

In some cases, the stepped groove may include: a rear gap portion sized to receive the gasket; and a front gap portion sized to enable a bearing to ride along the track section while promoting cleaning of the front gap portion.

In some cases, the front gap portion may be more steeply angled than the rear gap portion.

In some cases, the conveyor system may include an internal cooling system configured to draw air inwards towards electronic circuitry housed within the track system.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

DETAILED DESCRIPTION

Generally, the present disclosure is directed to a linear motor conveyor system intended to be used in an environment that requires reduced levels of contaminants, such as a clean, aseptic or sterile environment. The conveyor system is modular, including track sections that can be connected together lengthwise. The track sections have end profiles that can be abutted together to form a stepped groove between the track sections. The stepped groove may extend along the depth of the track sections and may have a wide rear portion and a narrow front portion. The rear gap portion may be filled with a gasket leaving only a small opening along the front gap portion that is intended to be easily cleaned. The track sections themselves may also be modular.

The system may further include a shaped top or cover which is configured to both seal the internal portions of each track section and also provide for directional airflow (sometimes referred to as aerodynamic airflow). In particular, the shaped top cover is intended to direct airflow to reduce or eliminate air that has contacted the system from contacting a product being conveyed.

The linear conveyor system may further include a moving element. It is intended that the moving element is configured with a bearing system intended to reduce the friction between the bearing system and guide rails of the linear motor conveyor system. With the reduced friction, it is intended that either no lubricant will be required, or a dry lubricant may be used to maintain the sterility of the environment.

Figure 1:
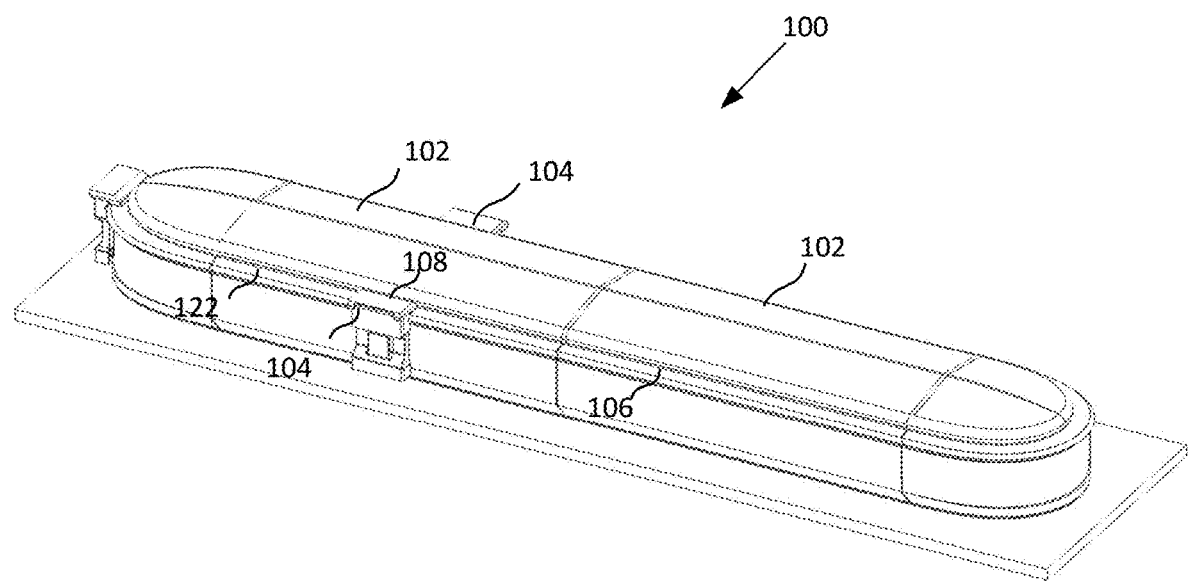
FIG. 1 illustrates an linear motor conveyor system according to an embodiment.
Figure 2A:
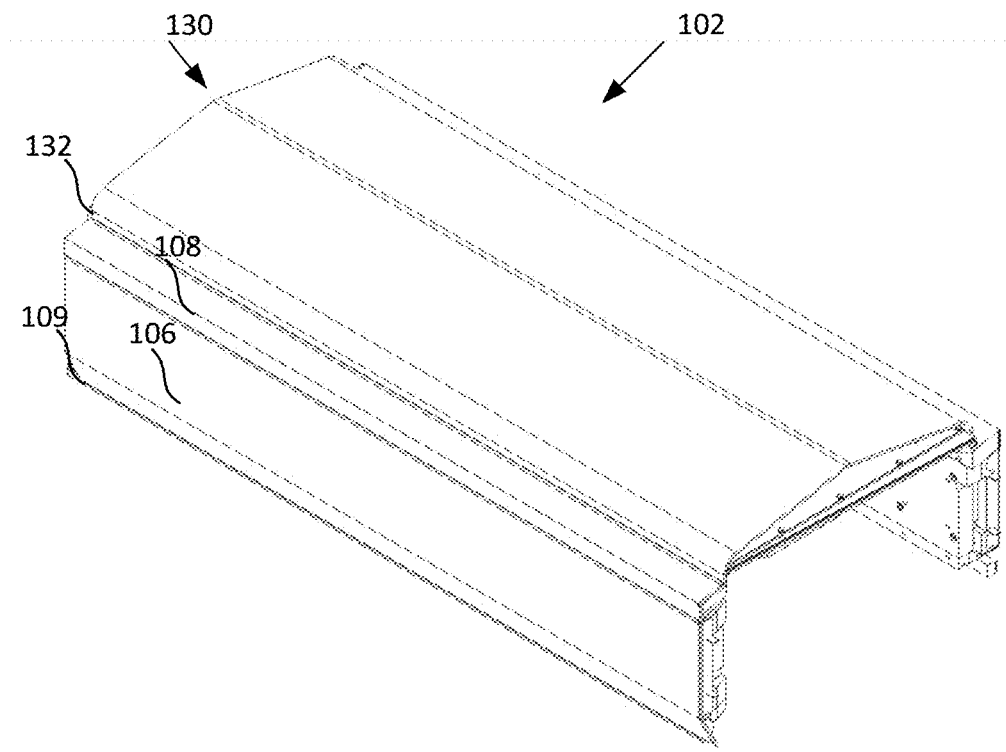
FIGS. 2A and 2B illustrate a front and back perspective view of a track section for an linear motor conveyor system according to an embodiment.
Figure 2B:
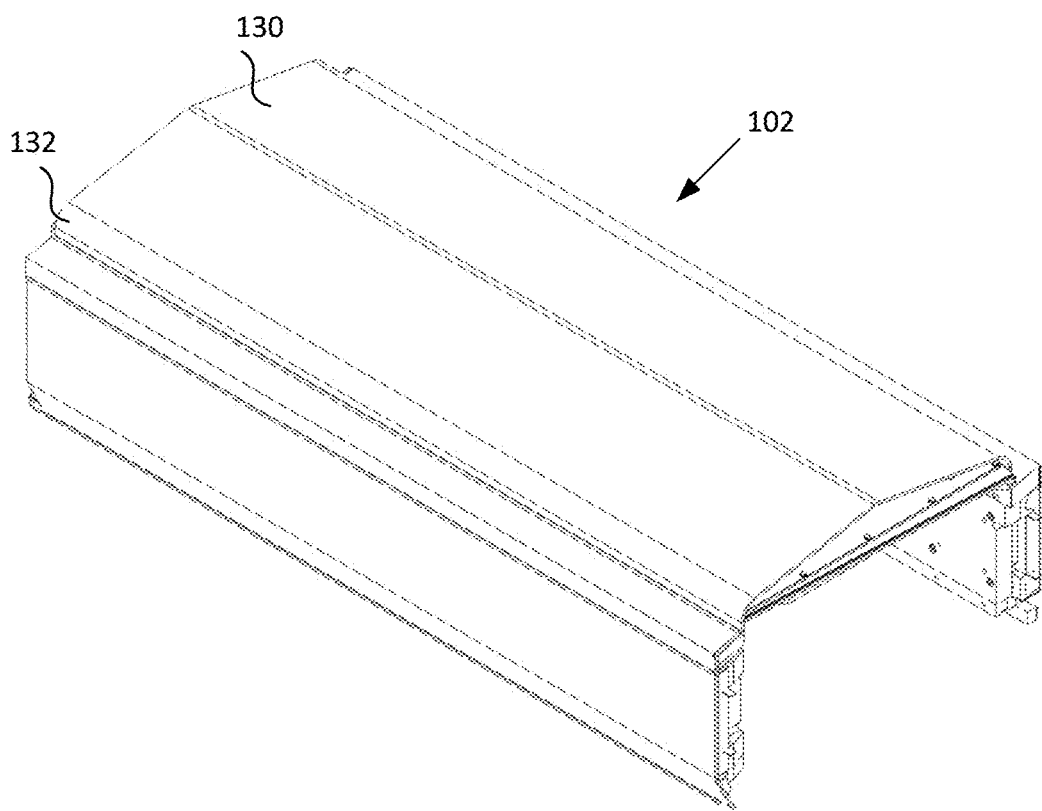
Figure 3A:
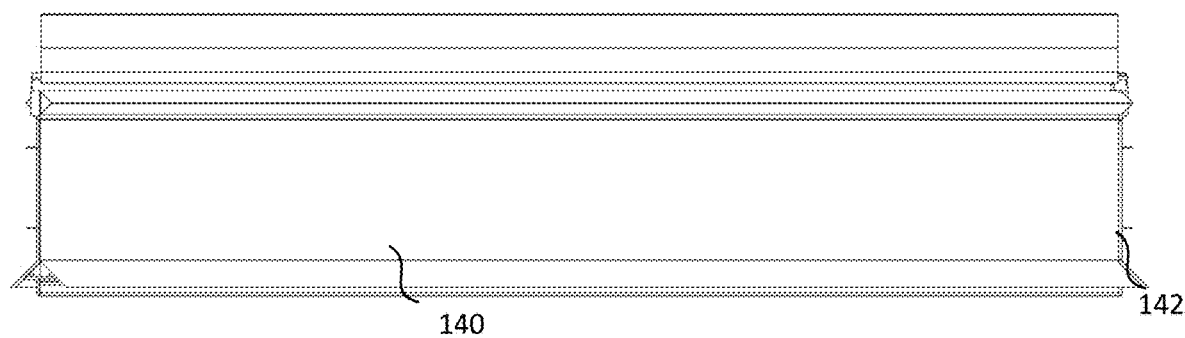
FIGS. 3A to 3D illustrate a front, back, left and right view of the track section shown in FIGS. 2A and 2B.
Figure 3B:
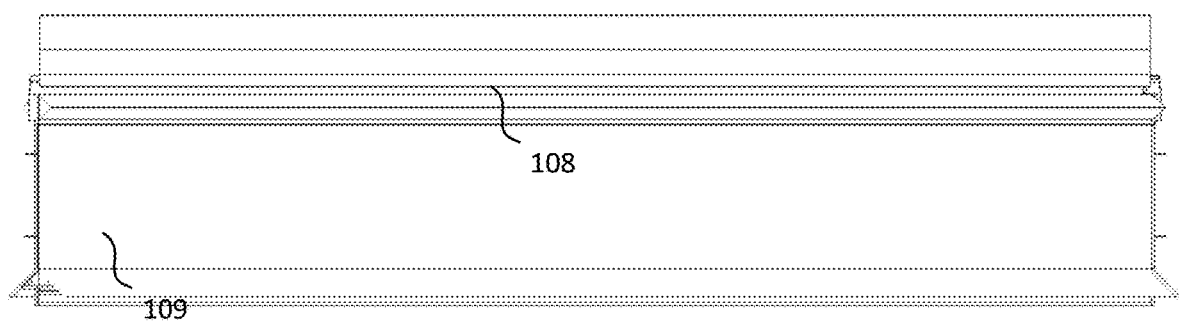
Figure 3C:
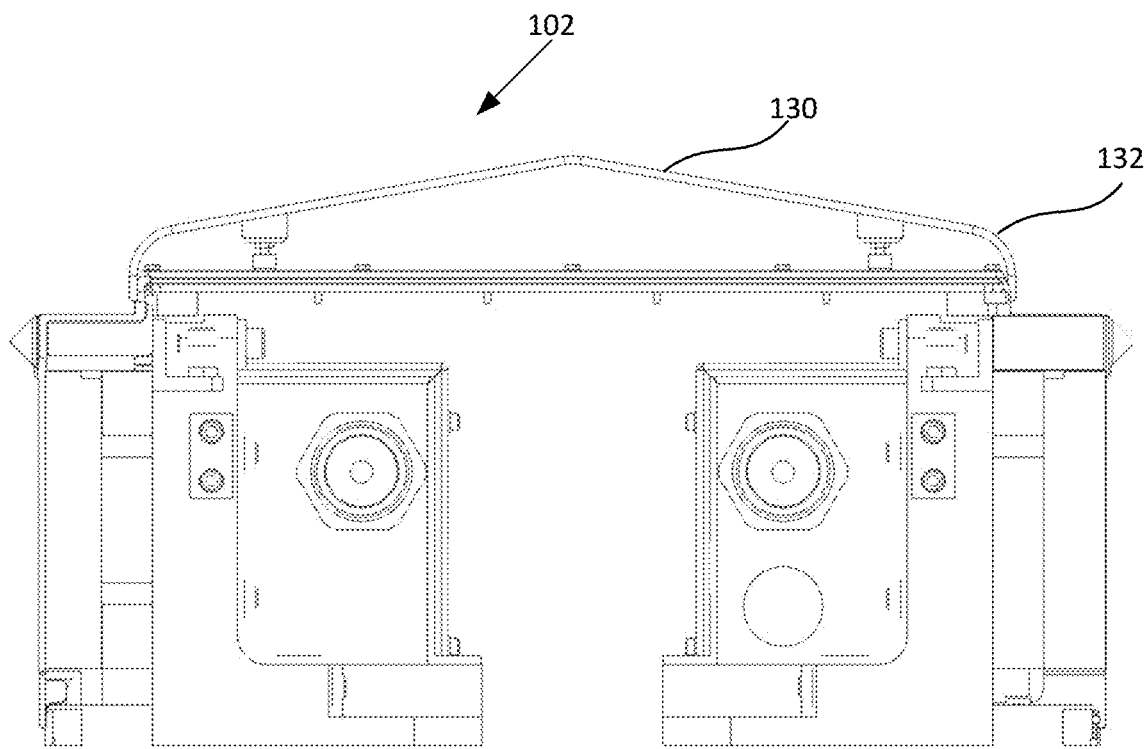
Figure 3D:
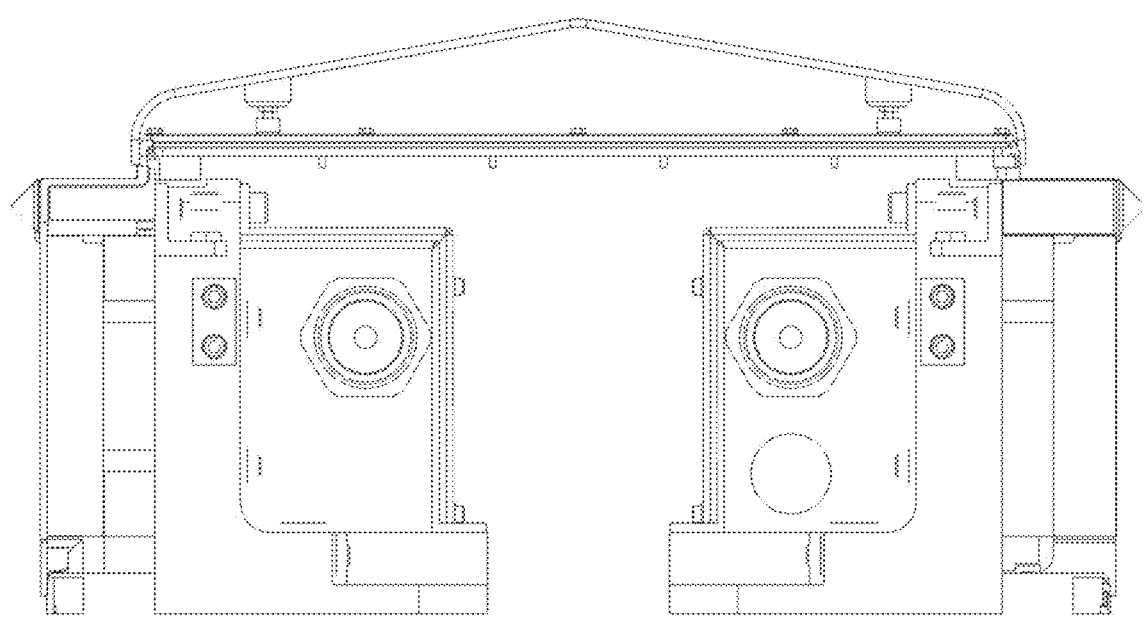
Figure 4A:
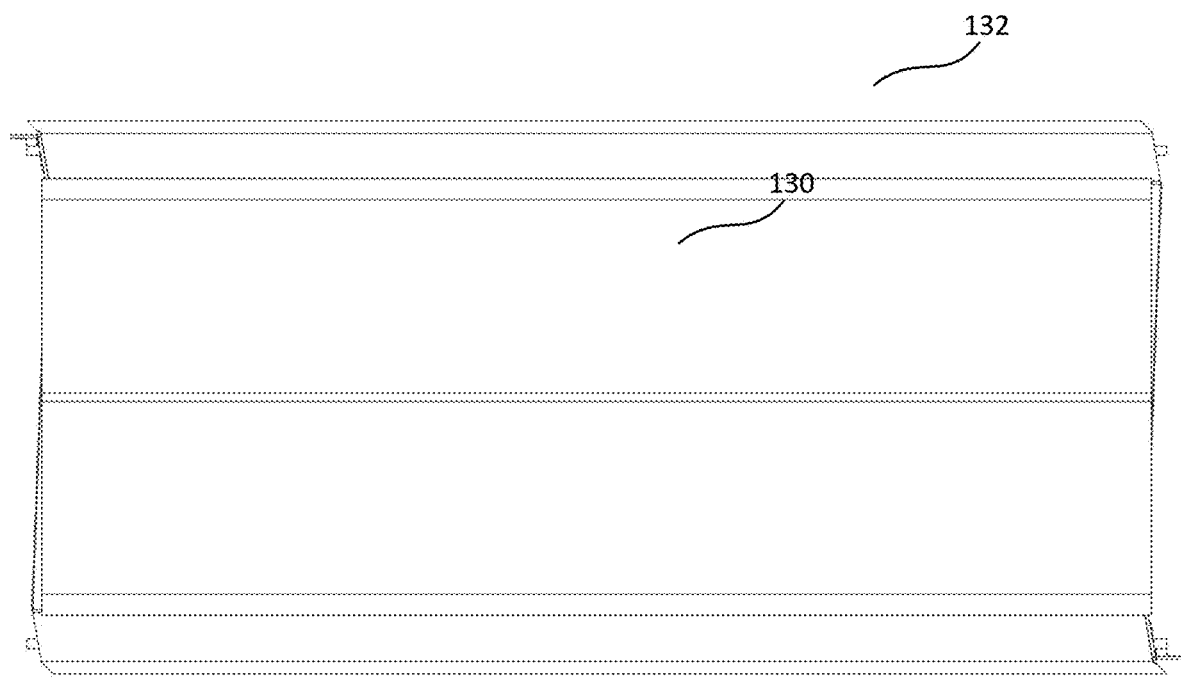
FIGS. 4A and 4B illustrate a top and bottom view of a track section of an linear motor conveyor system according to an embodiment.
Figure 4B:
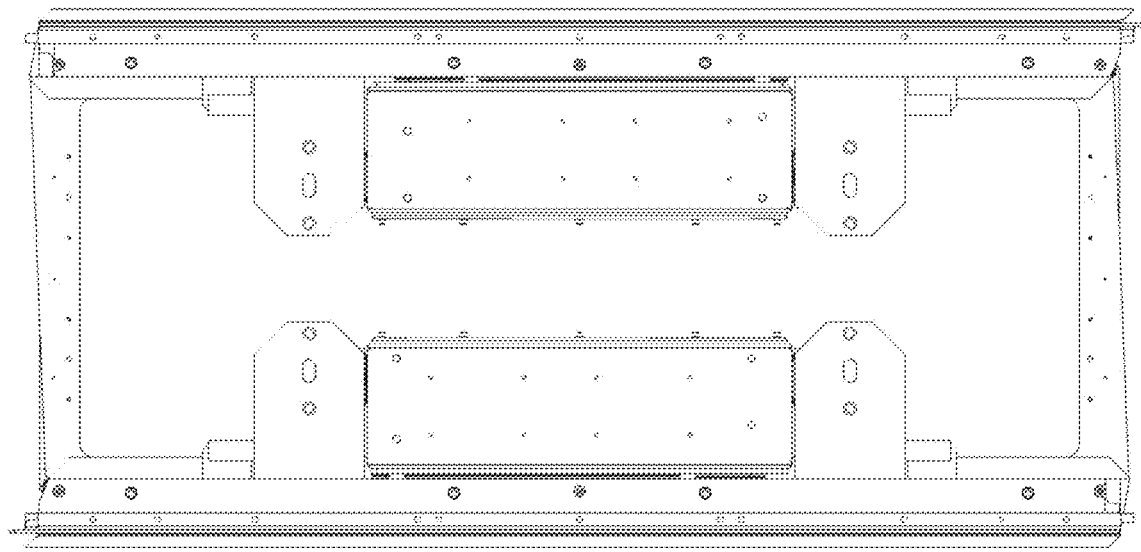
Figure 5A:
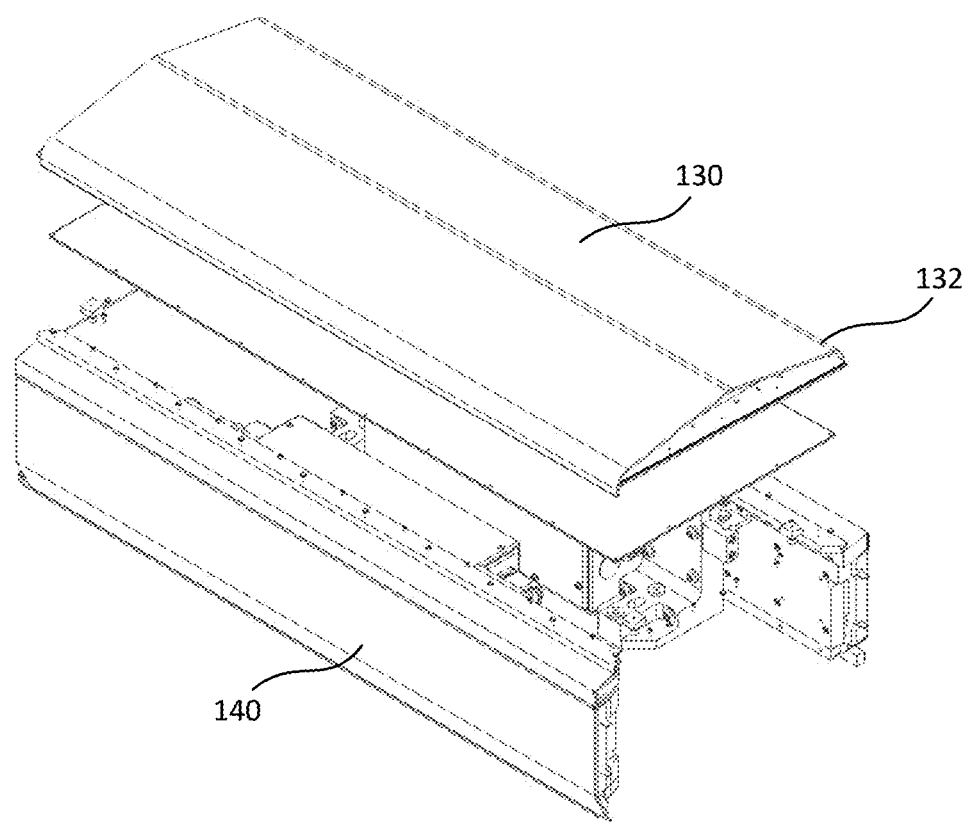
FIGS. 5A and 5B illustrate and front and back exploded view of a track section of an linear motor conveyor system according to an embodiment.
Figure 5B:
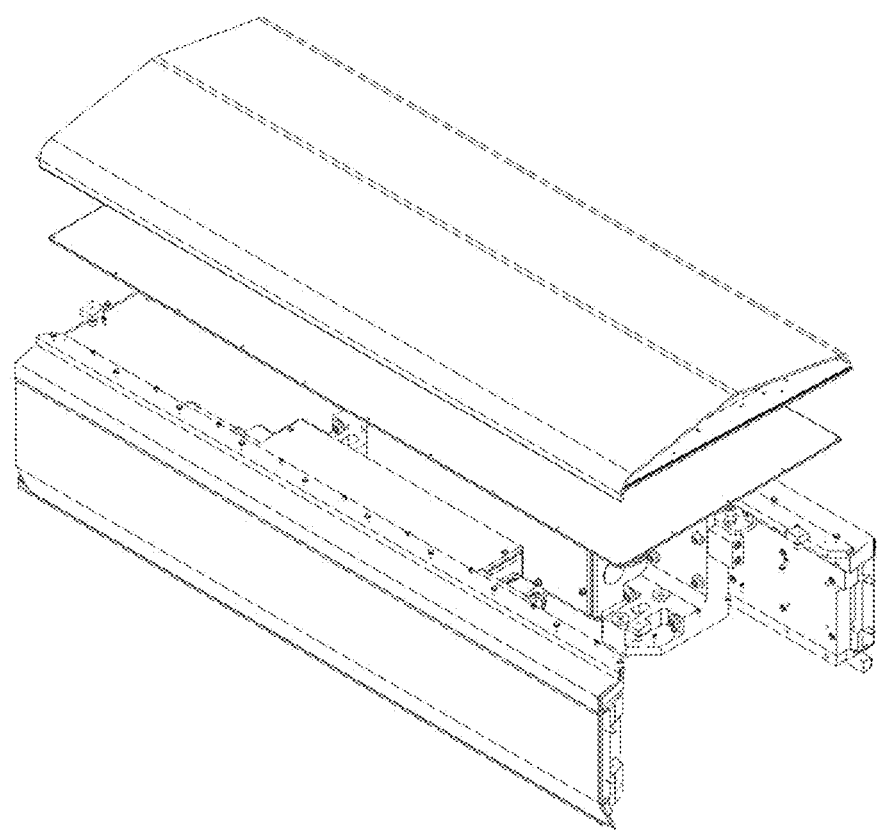

FIG. 1 illustrates an example of a linear motor conveyor system 100 having one or more track sections 102 defining a track 106, and one or more moving elements 104 which are configured to ride or travel along the track 106. In FIG. 1, there are two straight track sections 102, and two corner track sections, and two moving elements 104. Some of the principles of operation of a similar track section are described in more detail in U.S. Pat. No. 8,397,896 to Kleinikkink et al., which is hereby incorporated herein by reference.

In one example, the conveyor system 100 may include a plurality of track sections 102, which are mechanically self-contained and separable from one another so as to be modular in nature. In this embodiment, the track sections 102 are mounted on a support (not shown) so as to align and abut one another in order to form a longer track. In order to be modular, each track section 102 may house electronic circuitry for powering and controlling the track section 102.

The conveyor system 100 includes the track 106 that produces a magnetic force for moving the moving element 104 along the track 106. The magnetic force can also capture, support or hold the moving element 104 on the track 106. The magnetic force is partly generated by the interaction of the magnetic flux created by the embedded coils of the track 106 and magnetic elements of the moving element 104.

FIGS. 2A to 5B illustrate various views of the track section 102 enclosed by end caps rather than the 180-degree corners shown in FIG. 1. The track 106 includes a first guide rail 108 and a second guide rail 109 configured to support the moving element 104. The first and second guide rails 108, 109 are configured such that the moving element 104 may be removed from the track 106 when the magnetic force is overcome. The magnetic force is overcome, for example, where a user pries the moving element 104 away from the track 106. In an alternative, the moving element 104 may be removed from the track 106 where the magnetic force is reversed, reduced, or removed. In particular, in some embodiments, the guide rails 108, 109 have an open shape so that the bearings interacting with the guide rails 108, 109 engage with the guide rails 108, 109 in a way such that the bearings are not locked or held onto the guide rails 108, 109 other than by a magnetic force between moving element and the track.

In this embodiment, the first guide rail 108 supports the moving element 104 vertically and horizontally. The first guide rail 108 may have a protrusion or shaped profile to support and guide the moving element 104 on the track 106, for example, a "V" shape or a "U" shape or the like. In the figures, the first guide rail 108 is shown with a "V" shape. In this embodiment, the second guide rail 109 is flat and supports the moving element 104 horizontally. The second guide rail 109 may alternatively also have a protrusion or be shaped, such as a "V" or "U" shape or the like.

Each moving element 104 includes an extension 118 provided with a machine readable medium 120 (not visible in FIG. 1). In this embodiment, the machine readable medium is a magnetic strip but may alternatively be another appropriate medium such as an optically transmissive or reflective strip, or another type of feedback system, or encoder, or the like. In machine readable medium may be covered by a thin stainless cover. The extension 118 is configured such that the machine readable medium 120 interacts with sensors 122 provided to the track 106. In some cases, the sensors 122 may be covered in stainless steel tape, a thin stainless cover, or otherwise sealed in order to maintain the aseptic nature of the conveyor system. The sensors 122 are configured to read the machine readable medium 120, whether magnetically, optically, or otherwise as appropriate. The machine readable medium 120 and sensors 122 form a position sensing system. The position sensing system may be arranged such that the position sensing system is protected from traffic on the track section 102 and dust and other debris. For example, the machine readable medium 120 may be located on the bottom side of the extension 118.

In one embodiment, the sensors 122 are located on the track section 102 and the machine readable medium 120 is located on the moving element 104. In an alternative, the sensors 122 may be located on the moving element 104 and the machine readable medium 120 may be located on the track section 102. The sensors 122 are configured to read a position of the moving element 104 on the track section 102 from the machine readable medium 120. In some embodiments, the position of moving elements 104 may be detected in other ways (e.g. using RF-sensors, wireless triangulation or the like).

Figure 6:
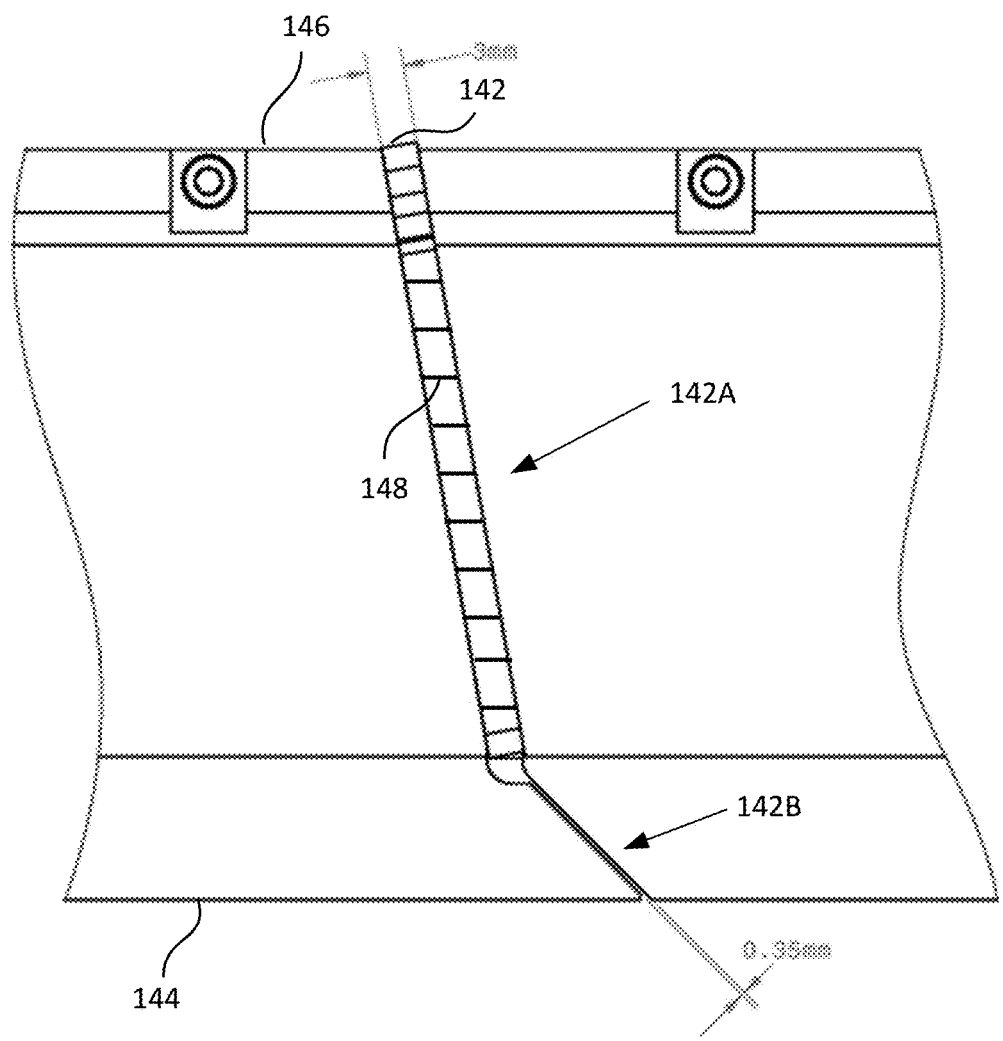
FIG. 6 illustrates a stepped groove according to an embodiment.
Figure 7A:
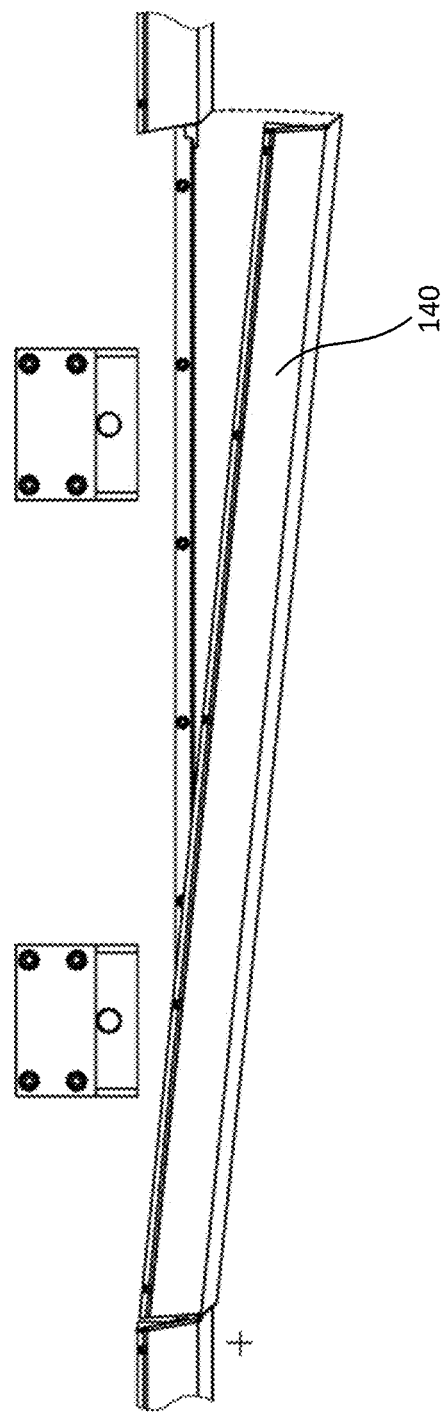
FIGS. 7A to 7C illustrate the movement of the track section from an open position to a partially open position to a closed position.
Figure 7B:
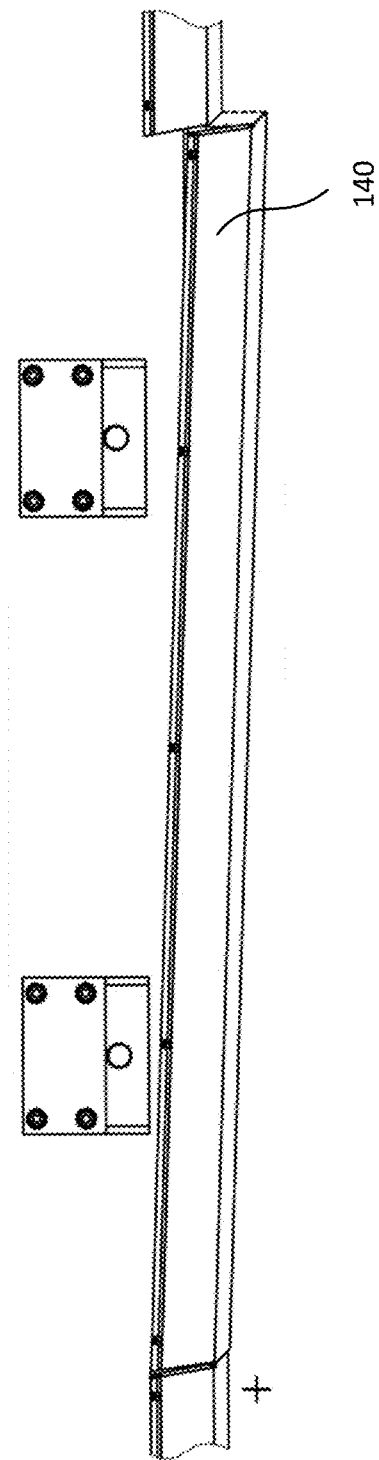
Figure 7C:
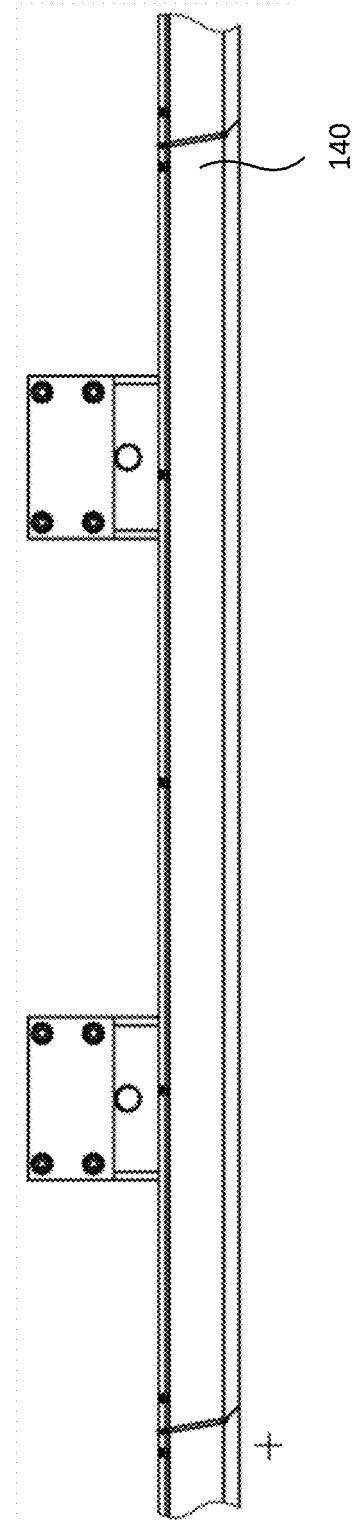

FIGS. 6 to 7C illustrate a stepped groove 142 and the corresponding movement of a rotatable segment 140 of the track section 106 according to an embodiment.

Each track section 106 includes a rotatable segment 140 to allow access to internal components of the linear conveyor system. The segment 140 may be accessed by rotating one end of the segment 140 and sliding the segment 140 away from the body of the track section 106. Allowing access to the internal components via the rotatable segment 140 is intended to reduce the need to dismantle the entire linear motor conveyor system 100. In contrast, some conventional conveyor systems require complete or extensive disassembly in order to access internal components of the linear motor conveyor system. This may increase complexity for maintenance and repairs. Furthermore, complete disassembly may lead to allowing dust, debris, or the like to be released into the environment, which tends to require significant cleaning of the location and conventional conveyor system itself.

It is intended that the rotatable segment 140 may include an end profile that abuts an adjacent track section to form a stepped groove 142 (also referred to as a two-stage groove) between the track sections. The stepped groove 142 may extend along the depth of the track sections from a front face 144 (where the moving elements are located) toward a rear face 146 (where the internal components of the linear motor conveyor system are located.) As shown, the stepped groove 142 may have a wider rear gap portion 142A and a narrow front gap portion 142B.

The rear gap portion 142A is intended to be on an angle and provide for a gap within a range of 2 mm to 5 mm. In some cases, this part of the gap will be approximately 3 mm. The gap may aid the track section 106 in providing for an area to allow for thermal expansion of the track section.

The rear gap portion 142A may be filled with a removable gasket 148 leaving only a small opening along the front gap portion 142B. The gasket may aid the system in reducing areas in which dust, dirt, debris, bacteria, or the like may collect. This may assist in maintaining a sterile environment around the linear conveyor system. The gasket 148 may be elastomeric or compressible material. The gasket material may be selected for compatibility with aseptic cleaning practices such as chemical spraying. For example, the gasket 148 may be a perfluoro-elastomer (FFKM), such as Virton™.

The front gap portion 142B may also be on an angle, which may be on a steeper or more acute angle than the rear gap portion 142A. The angle of the rear gap portion 142A and the front gap portion 142B may be selected to allow rotation of the rotatable segment 140 without contacting the adjacent track section. For example, the rear gap portion 142A may have an angle of approximately 10-degrees. The angle may depend on the length and width of the motor. It is intended to allow the motor to rotate in a manner that allows the gasket gap to open as the section is rotated. As the section is pivoted, the gap opens allowing access to the interior of the system.

The front gap portion 142B may have a gap within a range of 0.25 mm to 1 mm. In some cases the front gap portion 142B of the gap will be approximately 0.35 mm. It is intended that the front gap portion 142B be of a size that it may be flossed or otherwise cleaned in order to remove any dirt, debris, bacteria or the like, that may collect in this area. It is further intended that the gasket 148 may run behind the front gap portion 142B in order to reduce or eliminate the collection of dirt, debris, bacteria or the like that may otherwise collect behind the track section.

Similar to the rear gap portion 142A, the front gap portion 142B may be sized to allow for thermal expansion of the track sections. However, the front gap portion 142B is narrower than the rear gap portion 142A. One reason for the narrower gap size is because there is no compressible gasket in the front gap portion 142B. Specifically, the front gap portion 142B may shrink from 0.5 mm to 0 mm as operating temperatures rise. In contrast, the rear gap portion 142A may shrink from 3 mm to 2.5 mm, which accommodates reasonable compression of the gasket 148. Another reason for the narrower front gap portion 142B is that the small gap size can help reduce wear on the bearings that ride along the guide rail as the moving element 104 travels along the track. Furthermore, the angle of the front gap portion 142B may also assist in reducing wear or vibration of the bearings. For example, the front gap portion 142B may have an angle of approximately 45-degrees.

Figure 8:
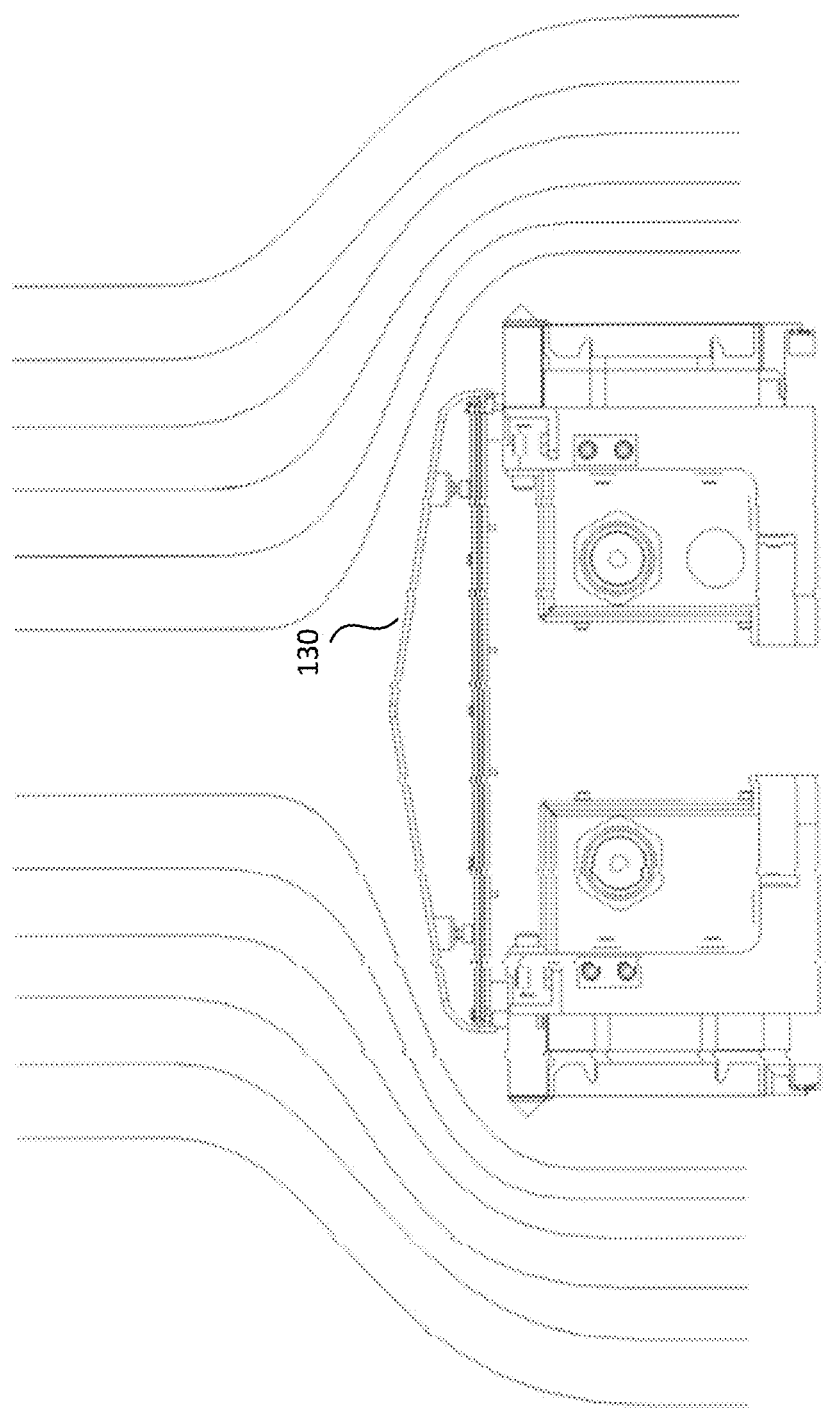
FIG. 8 illustrates airflow in association with a track section of an linear motor conveyor system.
Figure 9:
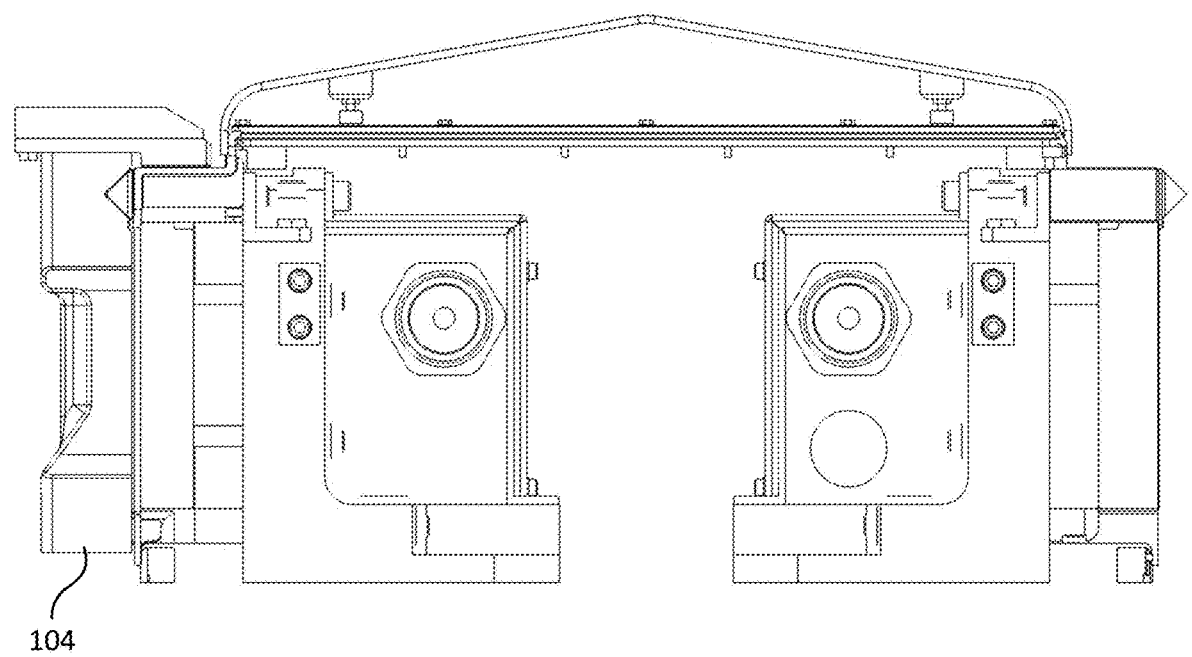
FIG. 9 illustrates airflow in association with a track section having a moving element.

FIGS. 8 and 9 illustrate airflow associated with the linear motor conveyor system 100. The linear motor conveyor system 100 may have an angled top 130. The angle is intended to aid in the circulation of clean or sterile air that may be blown in from a filter, for example, a HEPA-filter, ULPA 5 filter, or another source of sterile or sanitary air. It is intended that the angle is at a range to direct the air to interact with the product transported by the moving element 104 before interacting with another element of the linear conveyor system. In some embodiments, the angle may be between 0-degrees and 45-degrees. In the illustrated example, the angle of the cover 130 is approximately 10-degrees.

In some embodiments, the system 100 may include an internal cooling system, which may include, for example, a fan, blower, suction, or the like. This may help cool motors and other internal components that may heat up during operation. In some cases, the internal cooling system may circulate the sterile air inward through louvers on outer panels of the system 100 and toward internal components. This may be achieved by providing negative pressure within the internal compartment, for example, by using a vacuum pump or suction unit. It is intended that by drawing air inwards, the air in contact with the outer portion of the conveyor system is intended to be sterile or clean air, while the air, after being in contact with the conveyor system, is drawn into the internal area, away from the products being carried by the conveyor system. A sensor may monitor pressure or airflow and generate an alarm if negative pressure is lost, which could indicate a potentially non-aseptic environment. It will be understood that there are various ways to cool components if required and as understood in the art.

It is intended that the angled top 130 may include curved edges 132 where the top 130 is in contact with the body of the linear conveyor system. The curved edge is intended to further direct the flow of the air to avoid the air rippling or recirculating at the area which may lead to the air flow contacting the product carried by the moving element 104 after being in contact with other elements of the linear conveyor system. In some examples, the angled top 130 and the curved edges 132 may be configured to provide promote laminar flow. In contrast, turbulent flow may promote undesirable recirculating.

Figure 10A:
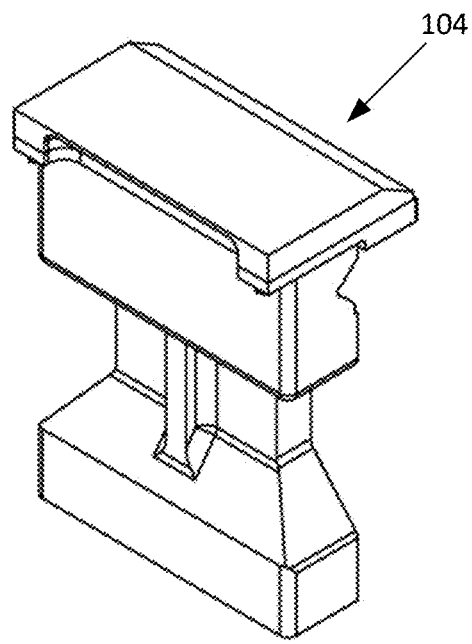
FIGS. 10A to 10O illustrate a front perspective and 2 different back perspectives of a moving element according to an embodiment.
Figure 10B:
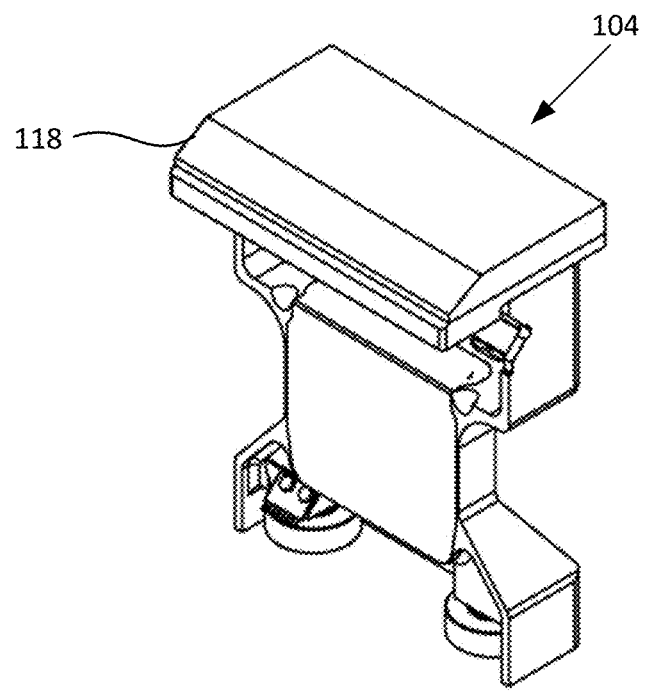
Figure 10C:
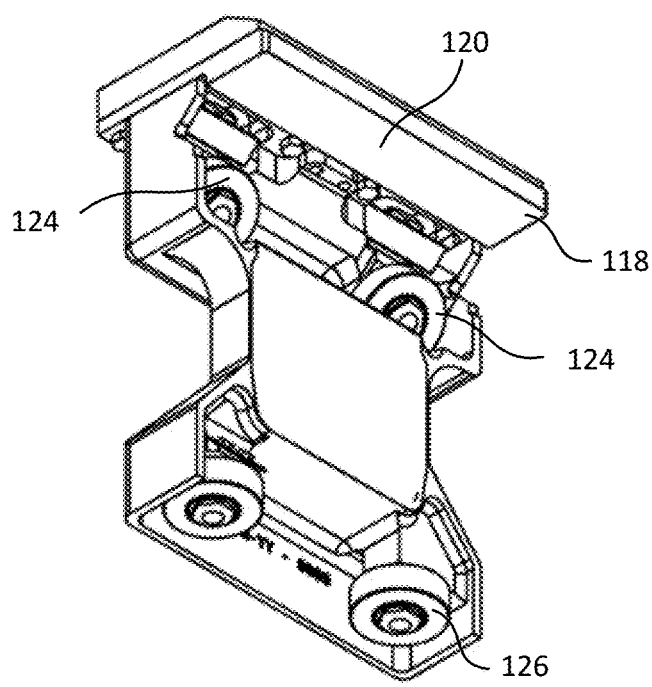
Figure 11A:
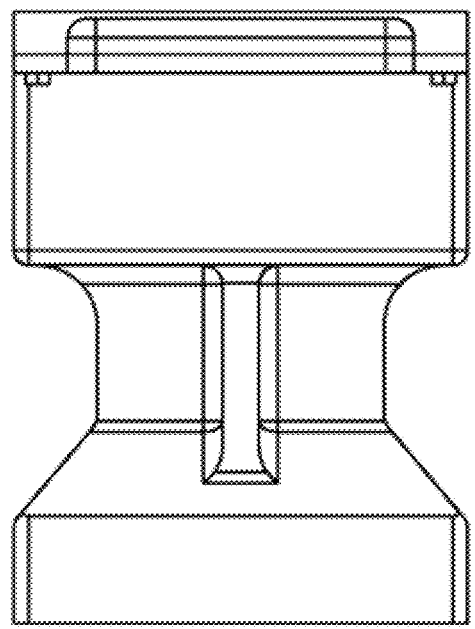
FIGS. 11A to 11O illustrate a front, back, and side view of a moving element for use with a linear motor conveyor system.
Figure 11B:
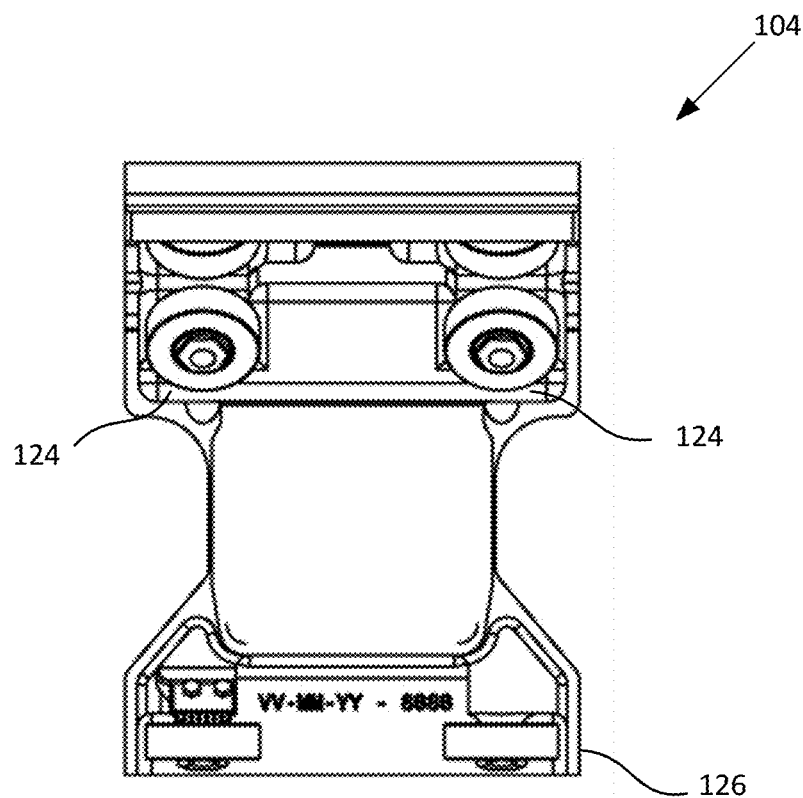
Figure 11C:
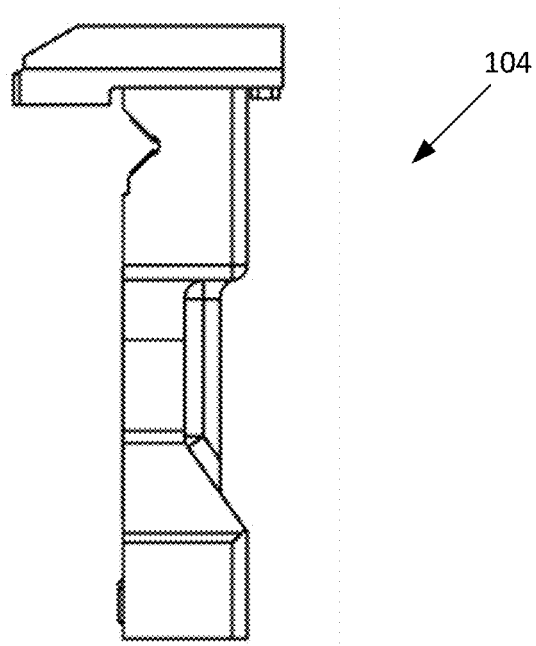

FIGS. 10A to 110 illustrate the moving element 104 associated with the linear motor conveyor system 100. The moving element 104 has a first set of bearings 124 and a second set of bearings 126. In this embodiment, the first set of bearings 124 is located above the second set of bearings 126. The first and second set of bearings 124, 126 may be wheel bearings that are rotatably attached to the moving element 104.

The first set of bearings 124 (also referred to as a first set of canted bearings) are intended to be provided at an angle corresponding to the "V" shaped profile of the first guide rail 108, for example a reversed "V" and abut against the top and bottom of the "V" shaped profile of the first guide rail 108. Having the bearings on an angle may reduce the wear or deterioration experienced by the bearings due to friction. The first set of bearings 124 may include two or more pairs of bearings located opposite one another to provide for the "V" shaped angle. The first set of bearings 124 may alternately be angled in such a manner to contact the angled first guide rail while continuing to the moving element 104 along both a Y axis (e.g. horizontally) and a Z axis (e.g., vertically). In certain cases, the moving element 104 has four bearings in the first set of bearings 124, two pairs of bearing may be separated around a center vertical axis of the moving element. In other embodiments, the first set of bearings 124 may have other configurations that engage the "V" shaped profile of the first guide rail 108. For example, the first set of bearings 124 may include two top downward-angled bearings spaced apart from a third central bottom upward-angled bearing. Alternatively, there may be two bottom upward-angled bearings spaced apart from a third central top downward-angled bearing.

The second set of bearings 126 provide a bearing surface that rides on the second guide rail 109. The second set of bearings 126 has an edge profile that corresponds to the profile of the second guide rail 109. In an embodiment, the second set of bearings 126 has a flat profile (e.g., a flat wheel) that matches the flat profile of the second guide rail 109. The second set of bearings 126 may roll a bit higher or lower on the second guide rail 109 to adapt to any non-parallelism of or with the first guide rail 108. In some cases, the second set of bearings 126 includes a plurality of bearings.

It is intended that the two sets of bearings 124, 126 provide for reduced friction between the bearings and the guide rails. In some cases, no lubricant may be required. In other cases, dry lubricant, for example a solid lubricant bar, may be included on the moving element 104 to apply Polytetrafluoroethylene (PTFE), Ultra-high-molecular-weight polyethylene (UHMWPE), or other lubricious polymers in either composite or non-composite forms, to the guide rails 108 and/or 109. Dry lubricant may contact or rub against the guide rail providing sufficient lubricant to reduce the drag or friction experienced by the moving element. As dry lubricant does not produce the same residue left by conventional lubricants such as oil, grease, or the like, dry lubricant may allow for the linear motor conveyor system to remain aseptic. Wet lubricant has been found to attract and hold bioburden and other contaminants, whereas dry lubricant may reduce this issue. Other examples of dry lubricant may include graphite, graphene, and fluorinated ethylene propylene (FPE).

In embodiments of the linear motor conveyor system 100 described herein, unlike conventional linear motor conveyors, the bearings (in this case, wheels) 124, 126, or the guide rails 108, 109 may be made of polymer materials. In some embodiments, the bearings 124, 126, bearing surfaces 125, 127, or the guide rails 108, 109 may be polymers such as nylon (e.g. Nylatron™), acetal resin (e.g. Delrin™), polyethylene terephthalate (e.g. Ertalyte™), or polyether ether ketone (i.e. PEEK). In some cases, some types of acetal resin (e.g. Delrin™) may be particularly advantageous. In some cases, the polymer material may be a coating provided to a bearing or guide rail of another material while in others the polymer material may form the bulk or all of the bearing or the guide rail In some examples, the coating on the bearing or guide rail may be a non-polymer material, such as a diamond like coating (DLC) or thin dense chrome (TDC) .These non-polymer coatings may promote use in aseptic environments.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether elements of the embodiments described herein are implemented as a software routine, hardware circuit, firmware, or a combination thereof.

Embodiments of the disclosure or components thereof can be provided as or represented as a computer program product stored in a machine-readable medium (also referred to as a computer-readable medium, a processor-readable medium, or a computer usable medium having a computer-readable program code embodied therein). The machine-readable readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor or controller to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor, controller or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

We claim:

1. A linear motor conveyor system comprising:
    at least one track section comprising:
        electronic circuitry housed within the track section; and
        a rotatable segment comprising an end profile that abuts another track section to form a stepped groove sealed by a gasket,
    wherein the stepped groove comprises:
        a rear gap portion sized to receive the gasket; and
        a front gap portion sized to enable a bearing to ride along the track section while promoting cleaning of the front gap portion.

2. A linear motor conveyor system according to claim 1, wherein
    the rear gap portion comprises a gap of between 1 and 5 mm; and
    the front gap portion comprises a gap of between 0.25 and 0.5 mm.

3. A linear motor conveyor system according to claim 1, wherein the front gap portion is more steeply angled than the rear gap portion.

4. A linear motor conveyor system according to claim 1, further comprising an internal cooling system configured to draw air inwards towards the electronic circuitry housed within the track system.

5. A linear motor conveyor system comprising:
    at least one track section comprising:
        a guide rail portion configured to support a moving element transporting an object;
        an angled top portion configured to direct air flow to contact the object prior to another element of the linear motor conveyor system; and
        a curved edge connecting the angled top to the guide rail portion, wherein the curved edge is configured to reduce air recirculation.

6. A linear motor conveyor system according to claim 5, wherein the at least one track section further comprises a plurality of sensors provided to read a machine readable medium located on the moving element, wherein the plurality of sensors are sealed within the at least one track section.

7. A linear motor conveyor system according to claim 6, wherein the plurality of sensors are sealed by stainless steel tape.

8. A conveyor system comprising:
    at least one track section comprising:
        a first guide rail having a protrusion with opposing angled profiles;
        a second guide rail having a flat profile;
        electronic circuitry housed within a body of the track section;
        a rotatable segment configured to provide access to the electronic circuitry, the rotatable segment having an end profile that abuts another track section to form a stepped groove sealed by a gasket;
        an angled top configured to direct air flow around the track section;
        a curved edge between the first guide rail and the angled top configured to reduce air recirculation; and
        a plurality of sensors sealed within a top portion of the track section; and
    at least one moving element comprising:
        a body;
        a first set of bearings attached to the body and configured to abut against the opposing angled profiles of the protrusion on the first guide rail;
        a second set of bearings attached to the body and configured to abut against the second guide rail; and
        a machine readable medium configured to be read by the plurality of sensors.

9. A conveyor system according to claim 8 wherein the conveyor system further comprises a solid lubricant.

10. A conveyor system according to claim 9 wherein the solid lubricant is polytetrafluoroethylene.

11. A conveyor system according to claim 8, wherein the plurality of sensors are sealed by stainless steel tape.

12. A conveyor system according to claim 8, wherein the stepped groove comprises:
    a rear gap portion comprising a gap of between 1 and 5 mm; and
    a front gap portion comprising a gap of between 0.25 and 0.5 mm.

13. A conveyor system according to claim 8, wherein the stepped groove comprises:
    a rear gap portion sized to receive the gasket; and
    a front gap portion sized to enable a bearing to ride along the track section while promoting cleaning of the front gap portion.

14. A conveyor system according to claim 13, wherein the front gap portion is more steeply angled than the rear gap portion.

15. A conveyor system according to claim 8, further comprising an internal cooling system configured to draw air inwards towards the electronic circuitry housed within the track section.

* * * * *